E. JUANES y PATRULLO.
Hackling Machine.
No. 32,143.
Patented April 23, 1861.
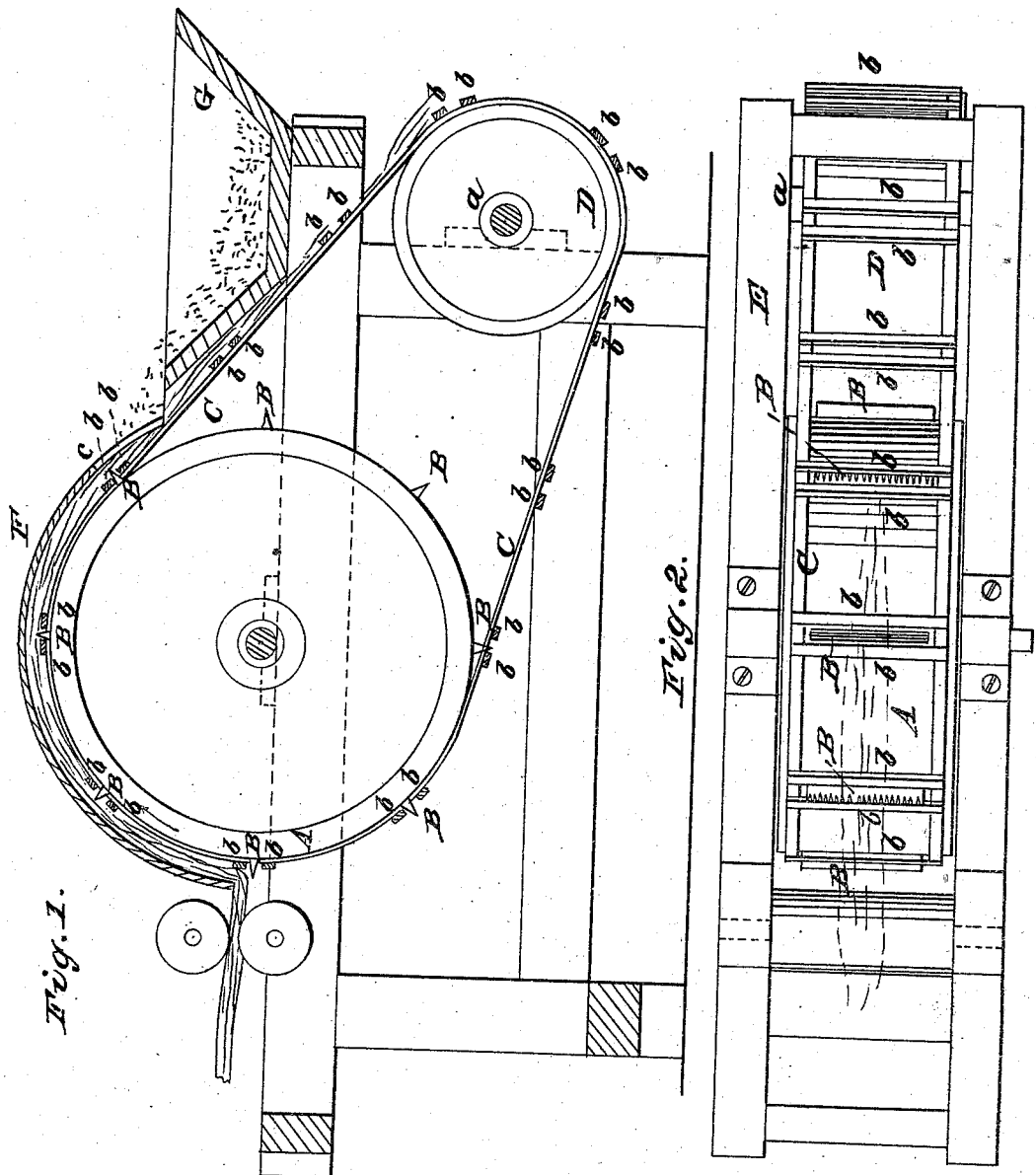

UNITED STATES PATENT OFFICE.

EDUARDO JUANES Y PATRULLO, OF MERIDA, MEXICO.

IMPROVEMENT IN MACHINES FOR DRESSING THE LEAVES OF AGAVE AMERICANA.

Specification forming part of Letters Patent No. 32,143, dated April 23, 1861.

*To all whom it may concern:*

Be it known that I, EDUARDO JUANES Y PATRULLO, of Merida, in the State of Yucatan and Republic of Mexico, have invented a new and useful Improvement in Machines for Dressing the Leaves of *Agave Americana;* and I do hereby declare that the following is a full, clear, and exact description of the same, reference being had to the accompanying drawings, forming a part of this specification, in which—

Figure 1 represents a longitudinal vertical section of my invention. Fig. 2 is a plan or top view of the same, the cap having been removed to expose the working parts.

Similar letters of reference in both views indicate corresponding parts.

This invention is intended to be an improvement on a machine for dressing the leaves of *Agave Americana* for which Letters Patent have been granted to me March 5, 1861; and it consists in the arrangement of an endless slatted apron which runs on the drum which carries the breakers and on a secondary drum, and which has the slats arranged in such relation to said beaters that they act as scrapers, removing from the beaters those parts of the leaves which are liable to adhere to the edges and impede the effect of said beaters.

To enable those skilled in the art to fully understand and construct my invention, I will proceed to describe it.

The drum A, with the beaters B, is identically the same as described in my former Letters Patent, with the only exception that the drum is sufficiently wide on its face to admit on each end of the beaters a belt, C, said belts being stretched from the drum A over the secondary drum D, which is arranged on a shaft, *a*, attached to the lower part of the frame E. The two belts C are connected by metallic slats *b*, arranged in pairs in such a position that when the drum A is rotated each pair of slats sweeps over one of the beaters B, as clearly shown in the drawings, and that said slats act as scrapers which remove from the beaters such portions of the leaves as are liable to adhere to the edges and impede the action of said beaters. The drum A is intended to rotate in the direction of the arrow marked upon it in Fig. 1, the leaves being fed to it through suitable feed-rollers, the same as described in my former Letters Patent; but, instead of passing down below, the leaves are now intended to be dressed above on the upper portion of the drum, and said drum is therefore covered by a cap, F, which may be made adjustable, and which serves to keep the leaves down upon the beaters. This cap is provided with an aperture, *c*, close before a trough, G, which is intended to receive the impurities thrown off by the scrapers *b*. Without these scrapers the edges of the beaters, particularly if the same are comb-shaped, are soon covered with the skin or flesh of the leaves, and their effectiveness is diminished, whereas by the use of said scrapers the beaters are kept perfectly clean, and, furthermore, the impurities are collected in the trough G, from which they can easily be removed and used for the manufacture of paper-pulp.

Having thus fully described my invention, what I claim as new, and desire to secure by Letters Patent, is—

The arrangement of the endless slatted apron C *b*, in combination with the beaters B, constructed and operating substantially in the manner and for the purpose shown and described.

EDUARDO JUANES Y PATRULLO.

Witnesses:
M. M. LIVINGSTON,
JAMES LAIRD.